United States Patent

Erath

[11] Patent Number: 6,161,433
[45] Date of Patent: Dec. 19, 2000

[54] FIBER OPTIC GEOPHONE

[75] Inventor: Louis W. Erath, Abbeville, La.

[73] Assignee: Geosensor Corporation, Houston, Tex.

[21] Appl. No.: 09/419,838

[22] Filed: Oct. 15, 1999

[51] Int. Cl.$^7$ .................................................. G01P 15/00
[52] U.S. Cl. .......................... 73/514.26; 73/653; 73/655
[58] Field of Search ................................ 73/514.26, 655, 73/653

[56] References Cited

U.S. PATENT DOCUMENTS

| | | | |
|---|---|---|---|
| 4,408,495 | 10/1983 | Couch et al. | 73/655 |
| 4,545,253 | 10/1985 | Avicola | 73/655 |
| 4,739,661 | 4/1988 | Bucholtz et al. | 73/514.26 |
| 4,800,267 | 1/1989 | Freal et al. | 73/514.26 |
| 4,860,586 | 8/1989 | Miers et al. | 73/514.26 |
| 4,915,473 | 4/1990 | Haese et al. | 73/655 |

*Primary Examiner*—Richard A. Moller
*Attorney, Agent, or Firm*—Felsman, Bradley, Vaden, Gunter & Dillon, LLP

[57] ABSTRACT

A geophone includes an optical element capable of changing its refractive index and path length in response to acceleration of the geophone. The sensor component comprises a mass mounted on a fulcrum for rotational movement against the force of a biasing member. An optical fiber is stretched between the casing of the sensor and an extension of the mass, such that rotational movement of the mass about the fulcrum varies the tension in the fiber. Varying the tension in the fiber varies the optical path length and index of refraction of the fiber, and these variations may be detected as a seismic signal. A first set of magnets dampens the vibratory movement of the mass, and a second set of magnets reduces the frequency of the movement of the mass.

11 Claims, 2 Drawing Sheets

FIBER OPTIC GEOPHONE

FIELD OF THE INVENTION

The present invention relates generally to the field of fiber optic sensing systems, and more particularly, to a geophone which generates a signal in response to a change in length of a fiber optic filament.

BACKGROUND OF THE INVENTION

The invention relates to a geophone which varies the optical path length of an optical fiber in response to a seismic signal for use in seismic exploration equipment. A seismic signal in this application refers to an acceleration or velocity signal. The geophone of this invention may be included within a sensor array which is formed as a string of transducer assemblies.

A conventional geophone uses a permanent magnet and electric coils suspended by springs or other means such as air, oil, and the like, to dampen oscillations of a mass within the geophone. A number of geophones are connected to a seismic cable, which ultimately is connected to a recording vehicle, such as a truck. A seismic signal is generated by way of an explosion or other vibration source. The vibrations create motion of the geophone which in turn causes the coil to move. The movement of the coil in the magnetic field induces a flow of electric current which is detected and recorded at the seismic truck.

The dynamic quantity measured by a geophone depends on the method for detecting the position of the mass, relative to the casing. Using electromagnetic induction in a pick-up coil gives a velocity output. A displacement geophone uses a detection method that measures the position of the mass directly and therefore gives an output that is proportional to casing displacement.

Fiber optic sensors that respond to variations in acceleration or velocity have shown increasing promise as geophones. Known means for measuring such variations include interferometers which detect changes in optical phase and spectrometers which detect spectral shifts. For example, certain fiber optic interferometric sensors respond to an acceleration or velocity signal developed from the reflection of a signal from a seismic source by varying the effective length of the fiber optic filament in response to the perturbation.

In such applications, optical fibers are made sensitive to acceleration or velocity of the sensor. An optical fiber exposed to such phenomena changes the medium through which a light or infrared beam passes that is guided by the fiber. Optical fibers have been considered for use as sensing elements and devices such as microphones, hydrophones, magnetometers, accelerometers, and electric current sensors, and particularly for geophones.

However, developers of such systems continue to seek a simple, inexpensive, yet sensitive geophones which can endure the often harsh conditions to which they are subjected. There remains a need for a such a geophone that is responsive to variations in displacement, velocity, or acceleration, using variations in the stress on a fiber optic element. To be commercially successful, such a geophone must be both robust and easily manufactured.

SUMMARY OF THE INVENTION

The present invention provides a cheap, robust, easy to manufacture geophone which modulates the path length of an optical fiber. In another aspect, the invention provides a means of converting movement of the geophone into path length variations of an optical fiber. Once the path length has been modulated in the optical fiber, one of several known data acquisition systems may be used.

In a further aspect of this invention, an element that is sensitive to an acceleration signal comprises an optical element capable of changing its refractive index and path length in response to acceleration of the sensor. The sensor component comprises a mass mounted on a fulcrum for rotational movement against the force of a biasing member. An optical fiber is stretched between the casing of the sensor and an extension of the mass, such that rotational movement of the mass about the fulcrum varies the tension in the fiber. Varying the tension in the fiber varies the optical path length and index of refraction of the fiber, and these variations may be detected as a seismic signal.

The sensor component is provided with a fin on the mass and the fin is positioned between a pair of opposite pole magnets. This arrangement provides for dampening of the envelope of the signal sinusoid developed by the sensor. The mass is also provided with a pair of same pole magnets which operate as negative rate magnets slow the frequency of the sinusoid.

Thus, there is provided a simple yet robust geophone which is easily manufactured in quantity, and which provides a direct measurement of a seismic signal.

These and other features of the present invention will be apparent to those of skill in the art from a review of the following detailed description along with the accompanying drawings.

DETAILED DESCRIPTION OF A PREFERRED EMBODIMENT

Figure 1:
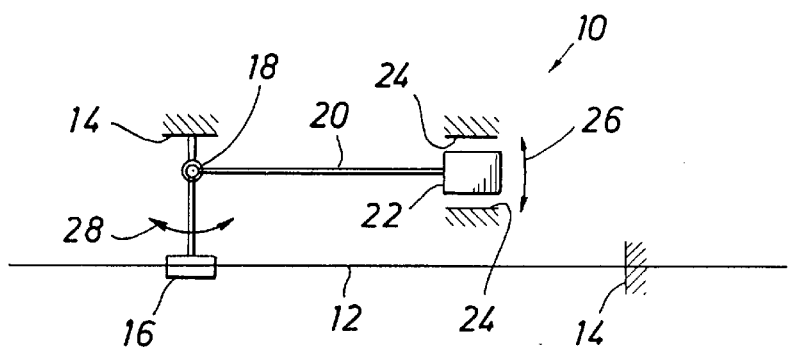
FIG. 1 is a schematic diagram of the geophone of this invention.

FIG. 1 is a schematic of the basic structural features of a geophone 10 of this invention. The geophone 10 comprises an optical fiber 12, which is mounted to a casing 14. The fiber 12 is also grasped at another point 16, for example by a clamp. The point 16 is mechanically coupled to a fulcrum 18, through which passes a bar 20. At one end of the bar 20 is a weight or mass 22. The travel of the weight 22 is constrained by stops 24. The fulcrum 18 is also mechanically coupled to the casing 14.

When subjected to a seismic signal, the casing 14 is displaced. This causes relative movement of the weight 22 in the direction of a double headed arrow 26. Relative movement of the mass 22 rotates the bar 20 about the fulcrum 18, causing the movement of the point 16 in the direction of a double headed arrow 28. This movement creates more or less tension on the fiber 12, thus causing a variation in the optical path length and index of refraction of the fiber 12 between the casing 14 and the point 16.

Figure 2:
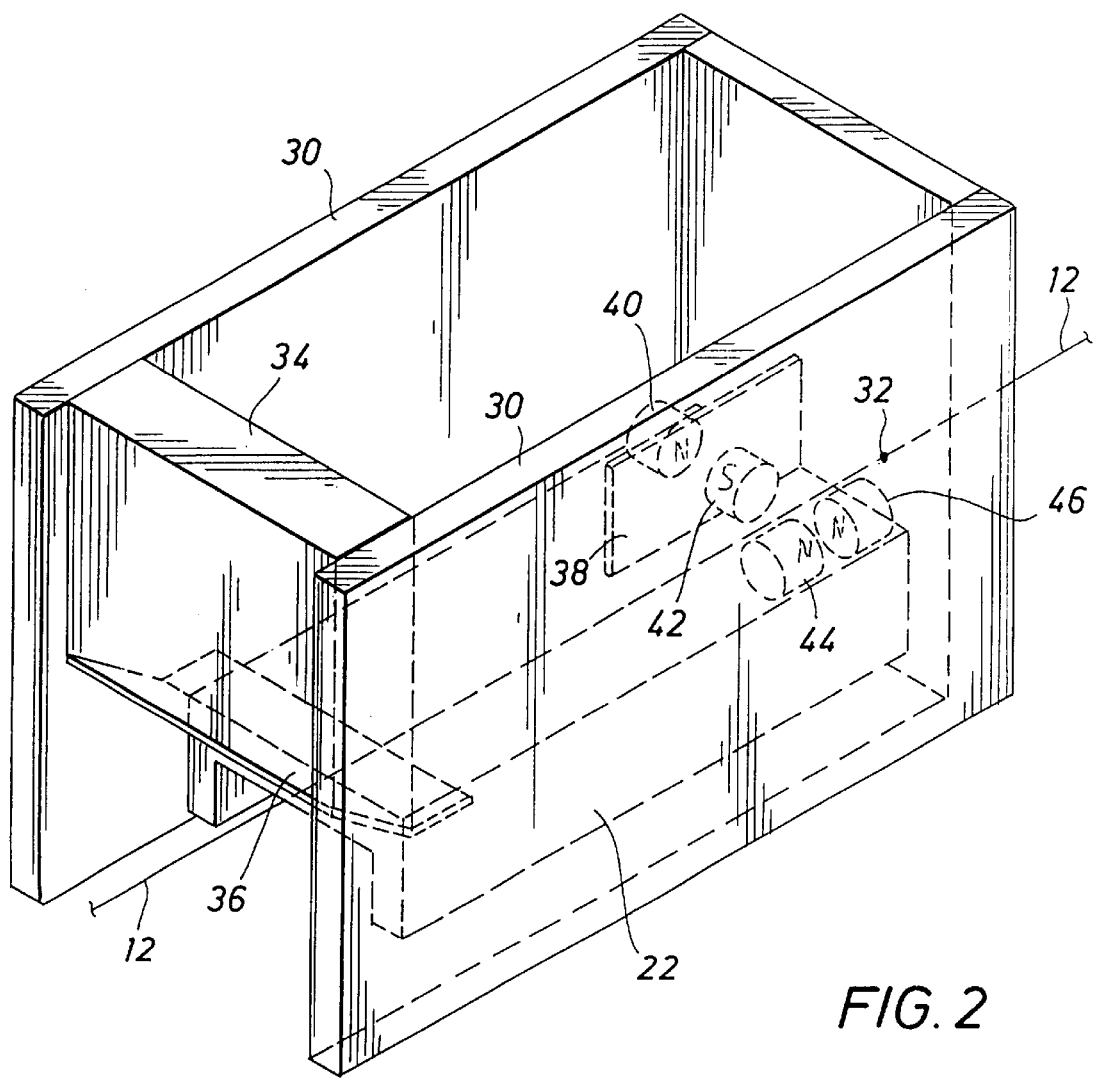
FIG. 2 is a perspective view of the geophone.

FIG. 2 depicts a perspective view of a currently preferred structure for carrying out this invention. Some of the details of the geophone and its mounting structure have been left out of FIG. 2 for clarity of explanation.

As shown in FIG. 2, the geophone is mounted within a frame 30. The optical fiber 12 is secured to the frame 30 at a point 32, which is preferably a clamp, shown below in FIG. 3b. The optical fiber 12 is also secured to the mass 22 for movement about a moment arm as the mass 25 22 is perturbed relative to the frame 30.

The frame 30 includes a cross member 34, which provides rigidity to the frame, and also serves as a mount for a biasing member, such as a leaf spring 36. The cross member 34 is secured to the leaf spring 36, as by bolts or the like, shown in FIG. 3b. The mass 22 is also secured to the leaf spring 36 in a similar manner, so that when the mass 22 is perturbed relative to the frame 30, the leaf spring flexes about an axis of rotation. The optical fiber 12 is secured to the end of the moment arm, and is thus subjected to a varying tension, which can be interpreted as a function of the seismic signal which created the perturbation.

A vertical fin 38, preferably of silver, is mounted perpendicularly on the mass 22. Mounted on either side of the fin 38 is a pair of magnets 40 and 42, with poles oriented in opposition. The magnets are shown in FIG. 2 with magnet 40 having its north pole toward the fin 38 and with magnet 42 with its south pole toward the fin 38, but these pole orientations may be reversed so long as they are opposed. The magnets 40 and 42 create a flux field through the fin 38, and this arrangement thus acts to dampen out the oscillations of the mass 22.

The geophone also includes a pair of magnets 44 and 46. The magnet 44 is mounted on the mass 22, and the magnet 46 is mounted on the casing 30, and these magnets have the same magnetic pole toward each other, north poles shown in FIG. 2. These magnets serve as negative rate magnets, to reduce the frequency of oscillation of the mass.

Figure 3A:
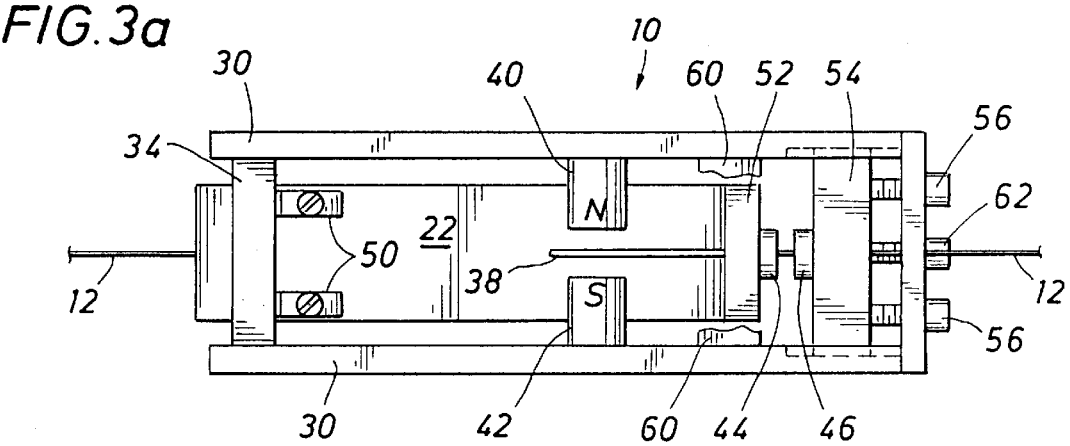
FIGS. 3a, 3b, and 3c are top, side, and bottom view of a preferred embodiment of the geophone of this invention.
Figure 3B:
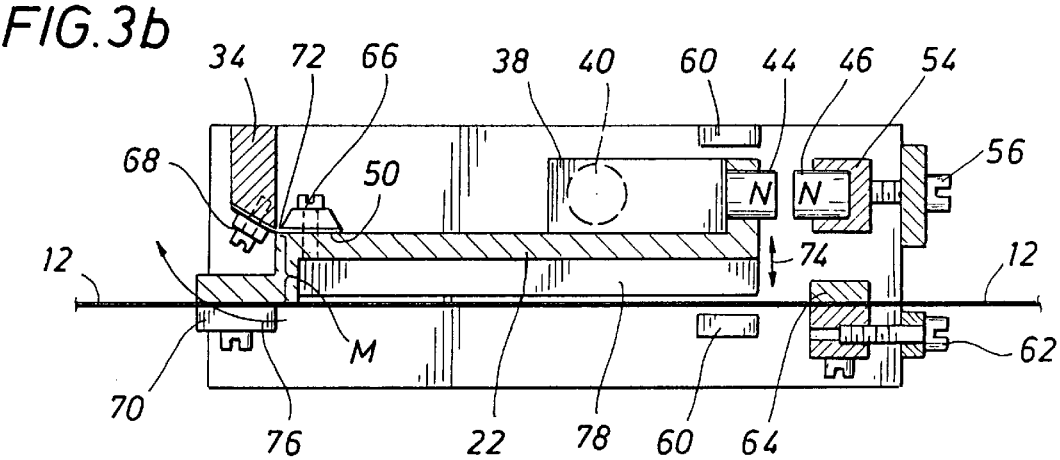
Figure 3C:
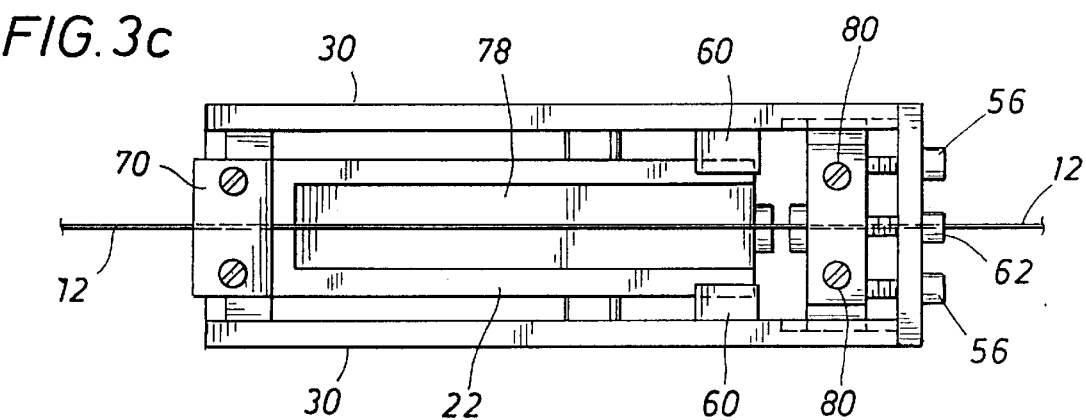

FIGS. 3a, 3b, and 3c depict further details of the geophone of this invention. FIG. 3a is a top view of the geophone which is mounted in a frame 30. The frame structure includes a rigid cross member 34. Mounted on the underside of the cross member 34 are biasing means 50, in this case a pair of spring hinges, rather than the leaf spring of FIG. 2. The fin 38 is mounted on top of the mass 22 between the damping magnets 40 and 42. The negative rate magnet 44 is mounted on a vertical member 52 of the mass 22, and the negative rate magnet 46 is mounted to an adjustment plate 54. The adjustment plate 54 may be moved in and out with a pair of adjustment screws 56, to increase or decrease the flux created by the negative rate magnets 44 and 46, and thereby adjust the frequency of oscillation of the mass 22.

The geophone 10 also includes a set of four stops 60. The stops 60 in FIG. 3a are shown as cut away, but the stops extend over the mass 22. Further, as shown in FIG. 3b, there a stops above and below the mass 22. These stops 60 serve to limit the travel of the mass 22, because unlimited travel could damage the geophone, particularly the leaf spring 36 or the springs 50.

The geophone 10 also includes an adjustment screw 62, which is provided to tune the quiescent tension on the optical fiber 12. The adjustment screw 62 adjusts the position of a V-groove clamp 64 (FIG. 3b), which firmly yet gently grasps the fiber 12.

Referring again to FIG. 3b, the mass 22 is secured to the springs 50 by a mounting bolt 66 or the like, and the springs 50 are secured to the cross member 34 in a similar fashion by mounting bolts 68. The optical fiber 12 is secured to the mass 22 with a V-groove clamp 70, which firmly and gently grasps the fiber 12. Between a point 72 at which the biasing means flexes and the clamp 70 is a moment arm M. As the mass 22 is perturbed as shown by an arrow 74, the moment arm M moves in a rotational direction as shown by an arrow 76, about the flex point 72.

Figure 4:
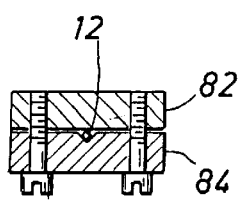
FIG. 4 is a section view of a V-groove clamp to hold an optical fiber in this invention.

As shown in FIG. 3c, the fiber 12 is clamped to the mass 22 with a clamp 70. In a similar fashion, the fiber is mounted to the casing by a clamp 64. The clamp 64 is held together with a pair of bolts 80, for example. The V-groove feature of the clamps 64 and 70 are shown in FIG. 4. The clamp comprises a flat member 82 and a grooved member 84, and the fiber 12 is clamped between them. In the case of the clamp 70, the flat member is the mass 22.

Note that the mass defines a open space 78 on its underside to avoid contact with the fiber 12. The only points of contact for the fiber are the clamps 64, which defines the location of a first point and 70, which defines the location of a second point.

The principles, preferred embodiment, and mode of operation of the present invention have been described in the foregoing specification. This invention is not to be construed as limited to the particular forms disclosed, since these are regarded as illustrative rather than restrictive. Moreover, variations and changes may be made by those skilled in the art without departing from the spirit of the invention.

I claim:

1. A geophone comprising:

a. a frame;

b. a mass mounted for rotational movement within the frame; and a. an optical fiber capable of changing length in response to the seismic signal, the fiber secured at a first point to the frame and at a second point to the mass, such that rotational movement of the mass varies the optical path length of the fiber between the first and second points.

2. The geophone of claim 1 further comprising a biasing means which mounts the mass to the frame.

3. The geophone of claim 2 wherein the biasing means comprises a leaf spring.

4. The geophone of claim 1, further comprising a V-groove clamp to secure the fiber to the frame.

5. The geophone of claim 4, further comprising adjustment means coupling the clamp to the frame, the adjustment means providing a means to adjust the tension in the fiber.

6. The geophone of claim 1, further comprising a V-groove clamp to secure the fiber to the mass.

7. The geophone of claim 1, further comprising a. a vertical fin on the mass; and b. a pair of damping magnets with mutually opposed pole; mounted on either side of the fin.

8. The geophone of claim 1, further comprising:

a. a first negative rate magnet mounted on the frame defining a first polar orientation; and b. a second negative rate magnet mounted on the mass opposite the first negative rate magnet, the second negative rate magnet defining the same polar orientation as the first negative rate magnet.

9. The geophone of claim 8, further comprising a. an adjustment plate to mount the first negative rate magnet to the frame; and b. means for adjusting the position of the adjustment plate to vary the distance between the first and second negative rate magnets.

10. The geophone of claim 1, further comprising a first stop mounted to the frame above the mass and a second stop mounted to the frame below the mass, the first and second stops limiting the rotational travel of the mass.

11. The geophone of claim 1, wherein the mass rotates about a fulcrum and the distance between the fulcrum and the second point defines a moment arm.

* * * * *